United States Patent
Knight et al.

(10) Patent No.: US 6,639,373 B2
(45) Date of Patent: Oct. 28, 2003

(54) DRIVER CIRCUIT FOR A VOICE COIL MOTOR IN A DISK DRIVE SYSTEM

(75) Inventors: Jonathan R. Knight, Tokyo (JP); Yasushi Kitamura, Tokyo (JP)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/966,465

(22) Filed: Sep. 28, 2001

(65) Prior Publication Data

US 2003/0062864 A1 Apr. 3, 2003

(51) Int. Cl.[7] ............................................. G11B 15/18
(52) U.S. Cl. ....................... 318/500; 360/75; 360/78.04
(58) Field of Search ................................ 318/442, 459, 318/500; 323/265, 271, 273, 282; 360/69, 75, 77.02, 78.04

(56) References Cited

U.S. PATENT DOCUMENTS 5,808,438 A * 9/1998 Jeffrey ......................... 318/634
6,054,825 A * 4/2000 Hayner ........................ 318/459
6,181,502 B1 * 1/2001 Hussein et al. ................ 360/69
6,373,208 B1 * 4/2002 Brito et al. ................... 318/379
6,441,681 B1 * 8/2002 White et al. ................. 327/545
6,465,994 B1 * 10/2002 Xi .............................. 323/274

* cited by examiner

*Primary Examiner*—Bentsu Ro
(74) *Attorney, Agent, or Firm*—W. Daniel Swayze, Jr.; W. James Brady; Frederick J. Telecky, Jr.

(57) ABSTRACT

The present invention provides an apparatus and system (300) supplying a regulated voltage of sufficient magnitude to enable de-latching of a head carriage from a latching device. In at least one embodiment, providing a voltage source for the voice coil motor (14) includes a regulator (310) having an input for receiving a first voltage potential and operably configured to provide a second voltage potential to an output selectively coupled to the voice coil motor (14) by a switch (345). A current source (315) is operably configured to provide a predetermined limited current via a pass transistor (325) associated with the regulator is also included. Further included is a capacitor (335) coupled to the regulator output and operably configured for charging by the current source via the current limited pass transistor.

17 Claims, 2 Drawing Sheets

DRIVER CIRCUIT FOR A VOICE COIL MOTOR IN A DISK DRIVE SYSTEM

BACKGROUND OF THE INVENTION

1. Technical Field of the Invention

The present invention relates generally to a disk drive system and, more particularly, to a driver circuit for a voice coil motor in a disk drive system.

2. Description of the Related Art

Conventional magnetic storage devices generally include a magnetic transducer head suspended in close proximity to a recording medium, such as a magnetic disk having a plurality of concentric tracks. The storage device also includes a spindle motor for rotating the disk and a head stack assembly that can include one or more read/write heads. The head stack assembly is controllably positioned over the magnetic disk by an actuator or a servo system in order to read or write information from or to particular tracks on the disk. A head is supported by a flexible suspension or carriage.

The carriage is controllably positioned by an actuator using a voice coil motor (VCM) so that the head can be properly positioned over a particular track on the magnetic disk to perform reading and the like of the magnetic information of the magnetic disk. When the rotation of the magnetic disk is stopped or the reading and the like of the magnetic information is not performed, the magnetic head is retracted to the "parking zone" of the magnetic disk. Understandably, such drives may be relatively sensitive to shocks occasioned by mishandling, excessive vibrations, drops and other events causing a rapid acceleration of the disk drive. Should the head crash into a spinning disk because of a rotational shock, for example, debris may be generated which may lead to read or write errors or may result in hard disk drive failure.

In an effort to mitigate the effects of such shocks, a number of latches have been developed to latch the head stack assembly and prevent the heads from contacting the disks. The operative mechanism of such latches are generally electromechanical or magnetic in nature. The function of a latch is typically to prevent the heads of the head stack assembly from leaving the parking zone on the disk during shock events that might otherwise jolt the heads from the parking zone and onto the data-carrying portion of the disk during nonoperative conditions of the drive. However, existing latches suffer from a number of disadvantages.

Generally, electromechanical and magnetic latches are used to attract and latch the head stack assembly when the drive is not in operation. Moreover, to ensure adequate shock protection, the latching force (the force with which the latch holds the head stack assembly to the permanent or electromagnet) must be sufficiently strong. A high magnitude latching force requires a correspondingly high de-latching force to free the head stack assembly. The stronger the magnet, however, the greater the current is necessary to de-latch the head stack assembly when the drive is called into active operation. In turn, such large de-latching current requires a higher capacity voltage supply. For integrated circuits, this de-latching requirement is generally larger than the supply voltage of the integrated circuit.

Therefore, it would be advantageous to provide a circuit to generate and regulate an output voltage sufficient to enable de-latching in which the output voltage is greater than the nominal supply voltage.

SUMMARY OF THE INVENTION

The present invention achieves technical advantages as an apparatus and system supplying a regulated voltage to a voice coil motor in a hard disk drive system in which the voltage is of sufficient magnitude to enable de-latching of a head carriage from a latching device. In at least one embodiment, providing a voltage source for the voice coil motor includes a regulator having an input for receiving a first voltage potential and operably configured to provide a second voltage potential to an output selectively coupled to the voice coil motor by a switch. A current source is operably configured to provide a predetermined limited current via a pass transistor associated with the regulator is also included. Further included is a capacitor coupled to the regulator output and operably configured for charging by the current source via the current limited pass transistor.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1A:
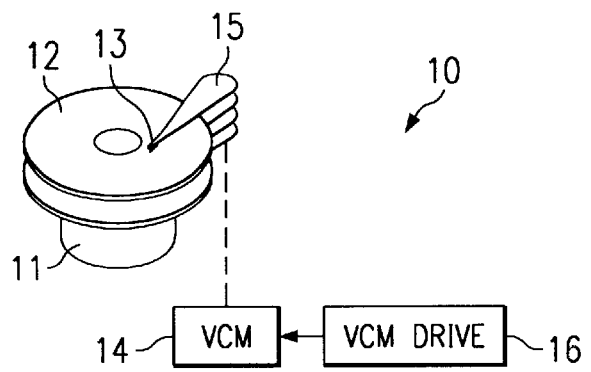
FIG. 1A illustrates a hard disk drive arrangement of an information recording/reproducing system.

The numerous innovative teachings of the present application will be described with particular reference to the presently preferred exemplary embodiments. However, it should be understood that this class of embodiments provides only a few examples of the many advantageous uses and innovative teachings herein. In general, statements made in the specification of the present application do not necessarily delimit any of the various claimed inventions. Moreover, some statements may apply to some inventive features, but not to others.

Throughout the drawings, it is noted that the same reference numerals or letters will be used to designate like or equivalent elements having the same function. A detailed description of known functions and constructions unnecessarily obscuring the subject matter of the present invention have been omitted for clarity.

Referring now to FIG. 1A there is illustrated a hard disk drive (HDD) arrangement of an information recording/reproducing system 10. In FIG. 1A, a magnetic disc 12 (such as 1.8 inch magnetic disc) which acts as an information data recording medium is attached to a spindle motor 11 for rotation. On the surfaces of the disc 12 there are areas each of which is divided into a plurality of tracks and which is also divided into a plurality of sectors in the rotational direction. Further, at the innermost circumferential portion or outside the outermost circumferential portion of the disc 12 there is formed a parking area or latching location.

At least one magnetic head 13 (for tracking the surfaces of the disc 12) is attached to the tip portion of a rotatable type swinging arm 15 which is rotatably driven by a voice coil motor 14. The voice coil motor (VCM) 14 is driven (at least in part) by a VCM drive 16 (discussed further below) in accordance with an exemplary embodiment of the present invention.

Figure 1B:
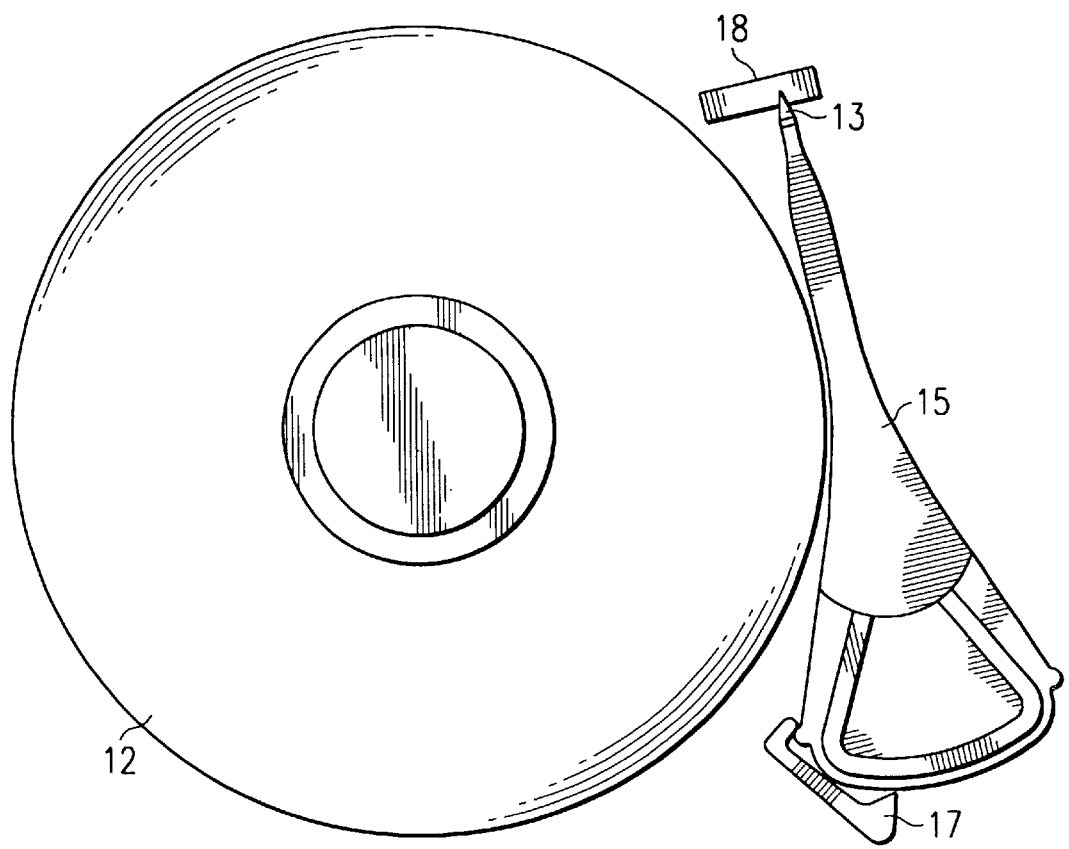
FIG. 1B illustrates a hard disk drive arrangement of an information recording/reproducing system.

Referring now to FIG. 1B there is illustrated a top view of a hard disk drive system with rotatable swinging arm 15 parked in a latching location 18 outside the outermost portion of the disk 12. Further, a magnet 17 is disposed at a predetermined position in close proximity to the arm 15 in relation to the latching location 18 of the disc 12 so as to lock the swinging arm 15 by means of a magnetic attraction force. It should be appreciated that the magnet 17 can be located in other positions relative to the arm 15. The head(s) 13 stay at a position corresponding to this latched position at the time of start and stop of rotation of the spindle motor 11. Further, in response to an appropriate voltage applied to the voice coil motor 14 by the VCM drive 16, the arm 15 overcomes the attracting force of the magnet 17 and rotates in a direction toward the disk tracks.

Figure 2:
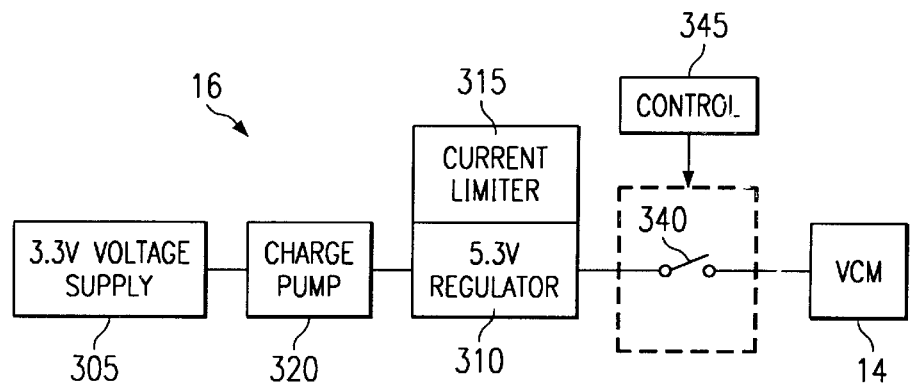
FIG. 2 illustrates a simple block diagram of a drive circuit in accordance with an exemplary embodiment of the present invention.

Referring now to FIG. 2 there is illustrated a simple block diagram of a VCM drive circuit 16 in accordance with an exemplary embodiment of the present invention. The charge pump 320 receives input power from a voltage supply 305 and generates a regulated (8.4V) voltage for various circuits on the IC, including the VCM load/retract circuitry. The (linear) voltage regulator 310 receives input power from the charge pump 320 and steps said voltage down and regulates it. The regulator 310 is also configured with a current limiting means 315 to prevent a voltage pulldown of the charge pump 320, which has limited output current capability.

For example, in an integrated circuit in a disk drive system operating at a supply voltage of approximately 3.3 volts, such as 1.8 inch HDD, where the voltage required for separating the head arm from its latched position is greater than the 3.3 volts, the charge pump 320 is configured to boost the 3.3 supply voltage to approximately 8.4 volts. In this exemplary embodiment, the input voltage to the regulator 310 is approximately 8.4 volts which is stepped down to approximately 5.3 volts to supply the voice coil motor (VCM) 14. A switch 340 is included to selectively connect the VCM 14 to the 5.3 voltage supply by controller 345.

Figure 3:
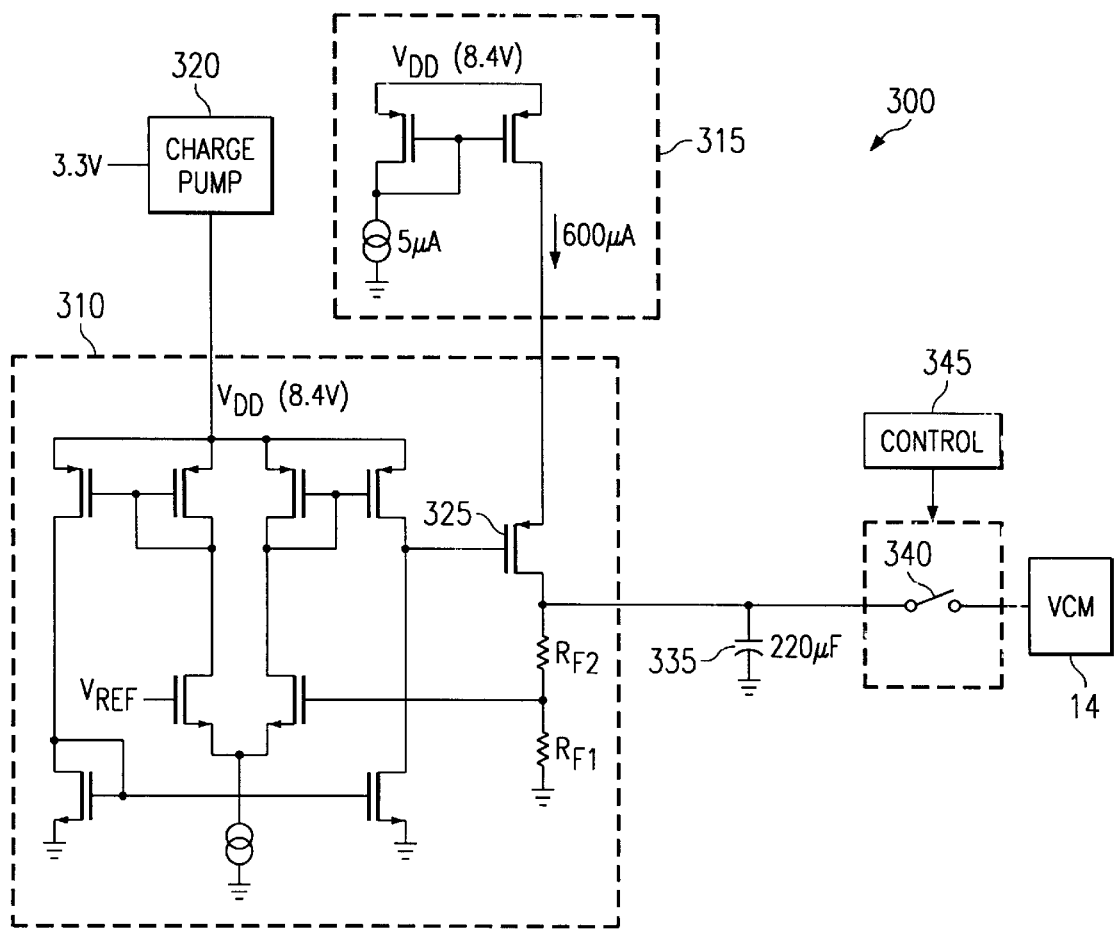
FIG. 3 illustrates a drive circuit for a 3.3 volt hard disk drive voice coil motor in accordance with an exemplary embodiment of the present invention.

Referring now to FIG. 3 there is illustrated a drive circuit 300 driving a HDD VCM 14 and operating at a nominal supply voltage of 3.3 volts in accordance with an exemplary embodiment of the present invention. The circuit 300 includes a 5.3 volts linear regulator circuit 310 provided with a 8.4 volt supply by charge pump 320, a current limiter circuit 315, and an external capacitor 335 in which the regulator circuit 310 controllably charges the capacitor 335. The current limiter circuit 315 can include a current mirror circuit with a pair of transistors and a current source arranged as shown in FIG. 3. In this embodiment the capacitor 335 is preferably a 220 μF capacitor. The regulator circuit 310 and current limiter circuit 315 are supplied with a VDD of approximately 8.4 volts. The VDD is supplied by charge pump 320 which boosts the 3.3 volts integrated circuit supply voltage to 8.4 volts. In this embodiment, the charge pump 320 can also supply a high voltage source to the spindle motor 11. A pass transistor (PMOS FET) 340 is included to selectively connect the voice coil motor 14 to the capacitor 335 by controller 345. The PMOS FET 340 can be integrated with the regulator circuit 310 or be external to the regulator circuit 310. The initial voltage present upon the 220 μF capacitor 335 (5.3 volts) and the energy stored in it, are sufficient to perform arm load and retract functions which would otherwise be difficult if not impossible with a 3.3 volts supply (or with the absence of a supply at all during a power loss retract sequence).

Advantageously, the regulator circuit 310 uses the 8.4 volt charge pump as its VDD supply, and circuit 315 limits the recharge of the capacitor 335 to avoid dropping the VDD voltage, especially after a load function has been performed. Thus, in this exemplary approach, the current with which the 5.3 volt regulator circuit 310 can charge the 220 μF capacitor 335 is limited through pass transistor 325 by circuit 315. If this were not done, the regulator circuit 310 would deliver current sufficient to pull the charge pump voltage down to below a level where the device will safely operate. For example, immediately following an arm load function, the regulator circuit 310 would attempt to recharge the 220 μF capacitor 335 to 5.3 volts with an unlimited current, the charge pump voltage would drop, the disk would stop spinning and the head would crash onto the disk.

In the present embodiment, the current limiter circuit 315 is a 600 μA current source connected in series with the regulator's pass transistor 325 to function as a current limit, and thereby allow the charge pump to maintain a safe operational voltage.

It should be noted that enabling a load function will discharge the 5.3 volt power supply capacitor 335. It will take approximately one second to charge the capacitor 335 back up after load is completed, and retract is limited during this time.

Although a preferred embodiment of the apparatus and system of the present invention has been illustrated in the accompanied drawings and described in the foregoing Detailed Description, it is understood that the invention is not limited to the embodiments disclosed, but is capable of numerous rearrangements, modifications, and substitutions without departing from the spirit of the invention as set forth and defined by the following claims.

What is claimed is:

1. A circuit for providing a voltage source for a voice coil motor in a disk drive system, said circuit comprising:
   a regulator having an input adapted to receive a first voltage potential and operably configured to provide a second voltage potential to an output adapted to couple to the voice coil motor;
   a pass transistor associated with said regulator;
   a current source having an input adapted to receive said first voltage potential and operably configured to provide a limited current; and
   a capacitor coupled to said regulator output and operably configured to be charged by said limited current via said pass transistor.

2. The circuit of claim 1 further including a charge pump having an input adapted to receive a supply voltage potential and operably configured to provide said first voltage potential, wherein a magnitude of said first voltage potential is greater than a magnitude of said supply voltage potential.

3. The circuit of claim 2, wherein said magnitude of said first voltage potential is greater than a magnitude of said second voltage potential, and said second voltage potential is greater than said magnitude of said supply voltage potential.

4. The circuit of claim 2, wherein said supply voltage potential magnitude is approximately 3.3 volts.

5. The circuit of claim 4, wherein said first voltage potential magnitude is approximately 8.4 volts.

6. The circuit of claim 1, wherein said second voltage potential magnitude is approximately 5.3 volts.

7. The circuit of claim 1, wherein said limited current is approximately 600 micro-amperes.

8. The circuit of claim 1, wherein said capacitor comprises a 220 micro-farad capacitor.

9. The circuit of claim 1, wherein said pass transistor comprises a field effect transistor.

10. The circuit of claim 1, wherein said regulator and said current source are integrated on a silicon chip.

11. A system for providing de-latching of a head arm in a disk drive, comprising:

- a coil motor coupled to the head arm and having an input adapted to receive a drive potential, said coil motor further operably configured to displace the head arm responsive to said drive potential; and
- a driver device having an input adapted to receive an operating potential and operably configured to provide said drive potential to said coil motor input, wherein a magnitude of said drive potential is greater than a magnitude of said operating potential, wherein said driver device includes:

- a charge pump having an input adapted to receive said operating potential and operable to provide a high voltage potential having a magnitude greater than a magnitude of said operating potential;
- a regulator having an input adapted to receive said high voltage potential and operable to output said drive potential;
- a pass switch associated with said regulator;
- a current source having an output coupled to said pass switch and operable to provide a predetermined current supply; and
- a drive capacitor coupled to said regulator output and operable to be charged by said current source via said pass switch; wherein said pass switch is operable to limit current by which said current source charges said drive capacitor to said predetermined current supply.

12. The system of claim 11, wherein said pass switch comprises a field effect transistor.

13. The system of claim 11, wherein said regulator and said current source are integrated on a silicon chip.

14. An integrated circuit driver for providing a first voltage potential to a voice coil motor, wherein said first voltage potential is greater than an input supply voltage potential of said integrated circuit driver, said integrated circuit driver comprising

- a charge pump circuit having an input adapted to receive said input supply voltage potential and operably configured to increase a magnitude of said input supply voltage potential;
- a drive capacitor having an input adapted to receive a charge current and an output coupled to the voice coil motor;
- a voltage regulator having an input adapted to receive said increased input supply voltage potential magnitude and having a transistor switch operably configured to limit said charge current; and
- a current source having an output coupled to said transistor switch and operably configured to provide a current supply, wherein said charge current is limited to said current supply.

15. The integrated circuit driver of claim 14, wherein said input supply voltage potential is approximately 3.3 volts.

16. The integrated circuit driver of claim 14, wherein said transistor switch comprises a field effect transistor.

17. The integrated circuit driver of claim 14, further including a switch operable to selectively couple said drive capacitor output and the voice coil motor.

* * * * *